(12) United States Patent
Wang

(10) Patent No.: US 11,218,986 B2
(45) Date of Patent: Jan. 4, 2022

(54) POSITIONING METHOD AND SERVER, AND TERMINAL

(71) Applicant: HUAWEI TECHNOLOGIES CO., LTD., Guangdong (CN)

(72) Inventor: Kaiyao Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/230,588

(22) Filed: Dec. 21, 2018

(65) Prior Publication Data

US 2019/0116577 A1   Apr. 18, 2019

Related U.S. Application Data

(63) Continuation of application No. PCT/CN2017/079323, filed on Apr. 1, 2017.

(30) Foreign Application Priority Data

Jun. 27, 2016   (CN) .......................... 201610482669.8

(51) Int. Cl.
   *H04W 24/00* (2009.01)
   *H04W 64/00* (2009.01)
   (Continued)

(52) U.S. Cl.
   CPC ........ *H04W 64/003* (2013.01); *G01C 21/206* (2013.01); *G01S 5/0027* (2013.01);
   (Continued)

(58) Field of Classification Search
   None
   See application file for complete search history.

(56) References Cited

U.S. PATENT DOCUMENTS

| 2010/0026513 A1* | 2/2010 | Pandey | G08B 21/0247 340/8.1 |
| 2016/0094941 A1 | 3/2016 | Shen et al. | |
| 2016/0205652 A1* | 7/2016 | Shu | H04W 4/70 455/456.1 |

FOREIGN PATENT DOCUMENTS

| CN | 102170697 A | 8/2011 |
| CN | 102419180 A | 4/2012 |

(Continued)

OTHER PUBLICATIONS

Machine Translation and Abstract of Chinese Publication No. CN102170697, Aug. 31, 2011, 19 pages.

(Continued)

*Primary Examiner* — Jinsong Hu
*Assistant Examiner* — Alexander J Yl
(74) *Attorney, Agent, or Firm* — Conley Rose, P.C.

(57) ABSTRACT

A positioning method and server, and a terminal are disclosed, to provide an indoor positioning manner with relatively high precision. The positioning method includes: receiving a first location fingerprint reported by a terminal; receiving a second location fingerprint and first displacement data that are reported by the terminal, where the first displacement data is used to represent displacement from a location corresponding to the first location fingerprint to a location corresponding to the second location fingerprint; and determining, according to the first location fingerprint, the second location fingerprint, the first displacement data, and reference fingerprints in a location fingerprint library, location information corresponding to the second location fingerprint.

20 Claims, 6 Drawing Sheets

(51) Int. Cl.
  *H04L 29/08* (2006.01)
  *G01S 5/00* (2006.01)
  *G01C 21/20* (2006.01)
  *H04W 4/02* (2018.01)
  *H04W 8/08* (2009.01)

(52) U.S. Cl.
  CPC ............ *G01S 5/0036* (2013.01); *H04L 67/22* (2013.01); *H04W 4/027* (2013.01); *H04W 8/08* (2013.01)

(56) References Cited

FOREIGN PATENT DOCUMENTS

| | | | | |
|---|---|---|---|---|
| CN | 102421188 | A | | 4/2012 |
| CN | 102905368 | A * | | 1/2013 |
| CN | 102905368 | A | | 1/2013 |
| CN | 103200678 | A | | 7/2013 |
| CN | 103440473 | A | | 12/2013 |
| CN | 103561462 | A | | 2/2014 |
| CN | 103841518 | A | | 6/2014 |
| CN | 103957503 | A | | 7/2014 |
| CN | 104535064 | A | | 4/2015 |
| EP | 2469298 | A1 * | 6/2012 | ........... G01S 13/878 |
| WO | 2015099738 | A1 | | 7/2015 |

OTHER PUBLICATIONS

Machine Translation and Abstract of Chinese Publication No. CN102421188, Apr. 18, 2012, 9 pages.
Machine Translation and Abstract of Chinese Publication No. CN102905368, Jan. 30, 2013, 18 pages.
Machine Translation and Abstract of Chinese Publication No. CN103440473, Dec. 11, 2013, 10 pages.
Machine Translation and Abstract of Chinese Publication No. CN103957503, Jul. 30, 2014, 9 pages.
Foreign Communication From A Counterpart Application, European U.S. Appl. No. 17/818,880.1, Extended European Search Report dated Jun. 6, 2019, 10 pages.
Foreign Communication From A Counterpart Application, Chinese Application No. 201610482669.8, Chinese Office Action dated Jun. 27, 2019, 8 pages.
International Search Report dated Jun. 5, 2017 in corresponding International Application No. PCT/CN2017/079323.
International Search Report, dated Jun. 5, 2017, in International Application No. PCT/CN2017/079323 (4 pp.).
Written Opinion of the International Searching Authority, dated Jun. 5, 2017, in International Application No. PCT/CN2017/079323 (8 pp.).

* cited by examiner

POSITIONING METHOD AND SERVER, AND TERMINAL

CROSS-REFERENCE TO RELATED APPLICATIONS

This application is a continuation of International Application No. PCT/CN2017/079323, filed on Apr. 1, 2017, which claims priority to Chinese Patent Application No. 201610482669.8, filed on Jun. 27, 2016. The disclosures of the aforementioned applications are hereby incorporated by reference in their entireties.

TECHNICAL FIELD

The present disclosure relates to the field of communications technologies, and in particular, to a positioning method and server, and a terminal.

BACKGROUND

Currently, indoor positioning is mainly performed by using a location fingerprint. The location fingerprint is identifiers of wireless signal sources and characteristic parameters of signals from the wireless signal sources, and the identifiers and the characteristic parameters are detected by a terminal at the location.

First, multiple reference points are selected in a spatial area, and a location fingerprint at each reference point is collected and used as a reference fingerprint. A server records location information and the reference fingerprint of each reference point, to form a fingerprint database.

Then, the terminal detects a location fingerprint at a location at which the terminal is located, and sends the location fingerprint to the server. The server matches the location fingerprint sent by the terminal and reference fingerprints in the prestored location fingerprint library, to determine one or more reference fingerprints. A degree of matching between the one or more reference fingerprints and the location fingerprint sent by the terminal is highest. The server determines, according to location information corresponding to the determined one or more reference fingerprints, location information of the location at which the terminal is located.

However, signal propagation of a wireless signal source is affected by factors such as multipath fading, scattering, diffraction, a shadow, and crowd movement. Consequently, a signal from the signal source has a time-varying characteristic and is unstable, and this affects positioning precision.

SUMMARY

This application provides a positioning method and server, and a terminal, to provide an indoor positioning manner with relatively high precision.

According to a first aspect, an embodiment of this application provides a positioning method, including: A terminal obtains a first location fingerprint at a first to-be-determined location by means of detection, and sends the first location fingerprint to a server. Then, the terminal obtains, by means of detection, a second location fingerprint at a second to-be-determined location and first displacement data used to represent displacement from the first to-be-determined location to the second to-be-determined location. The terminal sends the second location fingerprint and the first displacement data to the server. After receiving the first location fingerprint, the second location fingerprint, and the first displacement data, the server determines location information of the second to-be-determined location according to the first location fingerprint, the second location fingerprint, the first displacement data, and a locally stored location fingerprint library.

In the manner in which the server determines, according to the first location fingerprint, the second location fingerprint, and the first displacement data that are reported by the terminal, location information corresponding to the second location fingerprint, the server needs to separately perform matching on the first location fingerprint and the second location fingerprint, to determine the location information corresponding to the second location fingerprint. The location information corresponding to the second location fingerprint needs to be determined with reference to location fingerprints at two locations instead of depending on a location fingerprint at only one location. Therefore, impact, on positioning precision, of fluctuation of a location fingerprint detected at a single location is reduced, and positioning precision is improved.

In an optional implementation, first, the server calculates degrees of matching between the first location fingerprint and reference fingerprints in the location fingerprint library, and determines M reference fingerprints from the location fingerprint library, where a degree of matching between the M reference fingerprints and the first location fingerprint is highest. The M reference fingerprints are reference fingerprints in the location fingerprint library that are corresponding to the first M matching degrees in a matching degree sequence that is obtained after the degrees of matching between the first location fingerprint and the reference fingerprints in the location fingerprint library are sorted in descending order, where the degree of matching between the M reference fingerprints and the first location fingerprint is highest, and M is an integer greater than or equal to 2. Then, the server obtains M pieces of to-be-selected location information corresponding to the M prestored reference fingerprints, and performs a displacement operation between the M pieces of to-be-selected location information and the first displacement data. Location points represented by the M pieces of to-be-selected location information are used as M start points, and the M start points are displaced according to the first displacement data, to obtain location information of M end points. Next, the server determines, according to location information corresponding to the reference fingerprints in the location fingerprint library, location information of the M end points, and calculates degrees of matching between the second location fingerprint and the location fingerprints respectively corresponding to the location information of the M end points, to obtain M end point matching degrees. Next, the server determines location information of N end points from the location information of the M end points according to M start point matching degrees and the M end point matching degrees, where the M start point matching degrees are degrees of matching between the first location fingerprint and the M reference fingerprints, and N is a positive integer less than M. Next, the server determines, according to the location information of the N end points, the location information corresponding to the second location fingerprint. When performing matching on the second location fingerprint, the server does not need to compare the second location fingerprint with all the reference fingerprints in the location fingerprint library, but matches the second location fingerprint and the location fingerprints corresponding to the M end points. Generally, M is far smaller than a quantity of reference fingerprints in the location fingerprint library. Therefore, in this embodiment of this application, an amount of calculation for performing matching on the second location fingerprint is relatively small, and a time consumed for the matching is relatively short.

In an optional implementation, the server calculates a degree of matching between the first location fingerprint and a location fingerprint corresponding to each of the M start points, to obtain a start point matching degree, and calculates a degree of matching between the second location fingerprint and a location fingerprint corresponding to an end point obtained after the start point is displaced by using the first displacement data, to obtain an end point matching degree, so as to obtain a group of a start point matching degree and an end point matching degree, where the start point matching degree is corresponding to the start point matching degree. After the foregoing matching degree calculation is performed on the M start points and the M end points corresponding to the M start points, M groups of start point matching degrees and end point matching degrees are obtained, where the start point matching degrees match the end point matching degrees. Then, the server calculates a weighted sum of each group of a start point matching degree and an end point matching degree, sorts, in descending order, M weighted sums according to the M weighted sums obtained by means of calculation, and determines the first N weighted sums in the sorting that are referred to as N largest weighted sums. N is less than M. Next, the server determines, according to the location information of the N end points that is used to determine the N weighted sums, the location information of the second location fingerprint. In the foregoing implementation, end points corresponding to the N largest weighted sums are location points close to a location corresponding to the second location fingerprint. The location information of the second location fingerprint is determined according to the location information of the N end points that is used to determine the N weighted sums, so that positioning precision can be improved.

In an optional implementation, the server further receives a third location fingerprint and second displacement data that are reported by the terminal, where the second displacement data is used to represent displacement from a location corresponding to the third location fingerprint to a location corresponding to the first location fingerprint. The server determines, according to the first location fingerprint, the second location fingerprint, the first displacement data, the third location fingerprint, the second displacement data, and the reference fingerprints in the location fingerprint library, the location information corresponding to the second location fingerprint. The server determines location information of the terminal according to three location fingerprints and data of displacement between the locations. Therefore, impact, on positioning, of fluctuation of a single location fingerprint detected by the terminal is reduced, and positioning precision is improved. Actually, the server may also determine location information of one of four or more locations by using location fingerprints detected at the locations and data of displacement between the locations.

In an optional implementation, after determining the location information corresponding to the second location fingerprint, the server sends, to the terminal, the location information corresponding to the second location fingerprint, so that the terminal can learn of a location of the terminal.

In an optional implementation, the terminal actively reports, to the server at an interval of a time period, a location fingerprint and displacement data that are collected by the terminal.

In an optional implementation, the server sends an instruction to the terminal at an interval of a time period, to instruct the terminal to report, to the server, a location fingerprint and displacement data that are collected by the terminal.

According to a second aspect, an embodiment of this application provides a positioning server, where the positioning server is configured to perform the method in the first aspect or in any possible implementation of the first aspect. The positioning server includes a module configured to perform the method in the first aspect or in any possible implementation of the first aspect.

According to a third aspect, an embodiment of this application provides a positioning server, where the positioning server is configured to perform the method in the first aspect or in any possible implementation of the first aspect. The terminal includes a processor, a transceiver, and a memory. The processor is coupled to the transceiver and the memory. The memory is configured to store a location fingerprint library. The transceiver is configured to perform information transmission with a terminal, including: receiving a first location fingerprint, a second location fingerprint, and first displacement data that are reported by the terminal. The first displacement data is used to represent displacement from a location corresponding to the first location fingerprint to a location corresponding to the second location fingerprint. The processor is configured to perform the method in the first aspect or in any possible implementation of the first aspect by using the memory and the transceiver.

According to a fourth aspect, an embodiment of this application provides a positioning method, where the method includes the following steps: A terminal reports a first location fingerprint to a server. The terminal reports a second location fingerprint and first displacement data to the server, where the first displacement data is used to represent displacement from a location corresponding to the first location fingerprint to a location corresponding to the second location fingerprint. The terminal receives location information that is corresponding to the second location fingerprint and that is sent by the server, where the location information corresponding to the second location fingerprint is location information determined by the server according to the first location fingerprint, the second location fingerprint, the first displacement data, and reference fingerprints in a location fingerprint library.

In an optional implementation, the terminal receives an instruction that is sent by the server and that is used to instruct to upload a location fingerprint and displacement data to the server, and reports the second location fingerprint and the first displacement data to the server according to the instruction.

According to a fifth aspect, an embodiment of this application provides a terminal, where the terminal is configured to perform the method in the fourth aspect or in any possible implementation of the fourth aspect. The terminal includes a module configured to perform the method in the fourth aspect or in any possible implementation of the fourth aspect.

According to a sixth aspect, an embodiment of this application provides a terminal, where the terminal is configured to perform the method in the fourth aspect or in any possible implementation of the fourth aspect. The terminal includes a processor, a transceiver, and a displacement sensor. The processor is coupled to the transceiver and the displacement sensor. The transceiver is configured to perform data transmission with a server. The displacement sensor is configured to generate displacement data used to represent displacement between locations. The processor is configured to perform the method in the fourth aspect or in any possible implementation of the fourth aspect by using the displacement sensor and the transceiver.

According to a seventh aspect, an embodiment of this application provides a computer readable medium, where the computer readable medium is configured to store a computer program. The computer program includes an instruction used to perform the method in the first aspect or in any possible implementation of the first aspect.

According to an eighth aspect, an embodiment of this application provides a computer readable medium, where the computer readable medium is configured to store a computer program. The computer program includes an instruction used to perform the method in the fourth aspect or in any possible implementation of the fourth aspect.

In this application, on the basis of the implementations provided in the foregoing aspects, the implementations may be further combined to provide more implementations.

DESCRIPTION OF EMBODIMENTS

The following describes the technical solutions of this application in detail with reference to the accompanying drawings and specific embodiments.

A process of creating a location fingerprint library is first described below.

Figure 1:
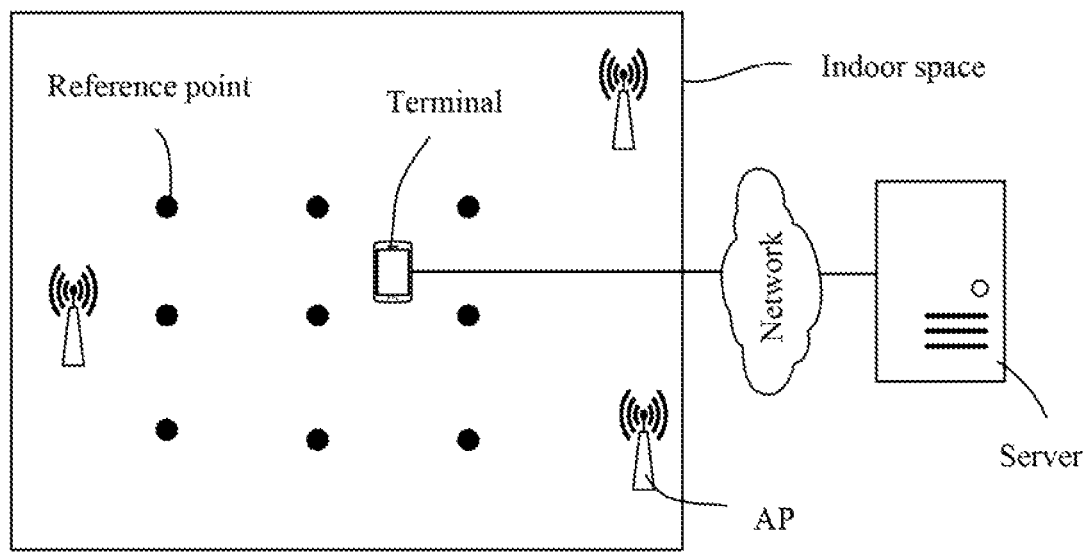
FIG. 1 is a schematic diagram of a communications system according to an embodiment of this application.

Referring to FIG. 1, signals from multiple wireless signal sources may be detected in a spatial area. However, wireless signal sources detected at different locations may be different, and characteristic parameters that are of signals from a same wireless signal source and are detected at different locations may be different.

For example, in an application scenario shown in FIG. 1, the wireless signal source may be an access point (English: access point, AP) in a wireless local area network (English: wireless local area networks, WLAN). A wireless signal source device may be disposed inside the spatial area, or may be disposed outside the spatial area. A large quantity of reference points are selected in the spatial area, and the reference points usually form a grid shape. Then, a detection device (such as any terminal) collects a location fingerprint at each reference point. The location fingerprint includes an identifier of each wireless signal source and a characteristic parameter of a signal from each wireless signal source. The identifier and the characteristic parameter are detected at the location. For example, when the wireless signal source is the AP, the identifier of the wireless signal source is a Media Access Control (MAC) address of the AP, and the characteristic parameter of the signal from the wireless signal source is a received signal strength indicator (English: received signal strength indicator, RSSI). In the following content in the embodiments of this application, the location fingerprint collected at the reference point is referred to as a reference fingerprint.

Then, a server used for positioning stores location information (such as GPS coordinates) and a reference fingerprint of each reference point, to form a location fingerprint library. Table 1 is an example of a location fingerprint library, where (Xj, Yj) is location information of a reference point j, and a value of j is 1, 2, 3 . . . .

TABLE 1

| Location information | Location fingerprint |
| --- | --- |
| Reference point 1 (X1, Y1) | (MAC1, RSSI1), (MAC3, RSSI2), (MAC4, RSSI3) . . . |
| Reference point 2 (X2, Y2) | (MAC1, RSSI4), (MAC2, RSSI5), (MAC4, RSSI6) . . . |
| Reference point 3 (X3,Y3) | (MAC1, RSSI7), (MAC2, RSSI8), (MAC3, RSSI9) . . . |
| . . . | . . . |

In the embodiments of this application, a terminal may be but is not limited to a smartphone, a smartwatch, a tablet computer, a virtual reality (English: virtual reality, VR) device, or an augmented reality (English: augmented reality, AR) device. The terminal may collect a location fingerprint at a current location of the terminal, and sends the collected location fingerprint to the server. The server matches the location fingerprint and a reference fingerprint, at a reference point, in the location fingerprint library. Performing matching on two fingerprints means that a degree of similarity between the two fingerprints is calculated. This may be implemented in multiple manners. For example, a Euclidean distance (English: Euclidean distance), a Manhattan distance (English: Manhattan Distance), or the like between the two fingerprints is calculated. A shorter Euclidean distance or Manhattan distance indicates a higher degree of matching between fingerprints. For multiple forms of a degree of matching between fingerprints and multiple methods for calculating the degree of matching between the fingerprints, refer to existing technical means. Details are not described in the embodiments of this application.

In a positioning method provided in the embodiments of this application, with reference to displacement data of the terminal, the server performs weighting on matching results that are of location fingerprints and are reported by the terminal at different locations, and determines location information of the terminal according to a weighting result. That is, the server does not determine the location information of the terminal only according to a current fingerprint matching result, but determines the location information of the terminal with reference to multiple fingerprint matching results, so as to reduce impact of accidental fluctuation of a signal from a signal source, and further improve positioning precision.

The displacement data of the terminal may be determined by using a sensor of the terminal, and is sent by the terminal to the server. The sensor may be but is not limited to a sensor such as an acceleration sensor, a gyroscope, a magnetic compass, or the like that can record a displacement direction or a displacement distance of the terminal. The displacement data of the terminal includes the displacement direction and the displacement distance of the terminal.

In addition, the terminal sends the detected location fingerprint and the displacement data to the server by using a communications network. An implementation of the communications network includes but is not limited to a Global System for Mobile Communications (English: global system for mobile communication, GSM), a general packet radio service (English: general packet radio service, GPRS), Code Division Multiple Access (English: code division multiple access, CDMA), Wideband Code Division Multiple Access (English: wideband code division multiple access, WCDMA), Long Term Evolution (English: long term evolution, LTE), and the fifth generation mobile communication system (English: the fifth generation mobile communication system, 5G).

Figure 2:
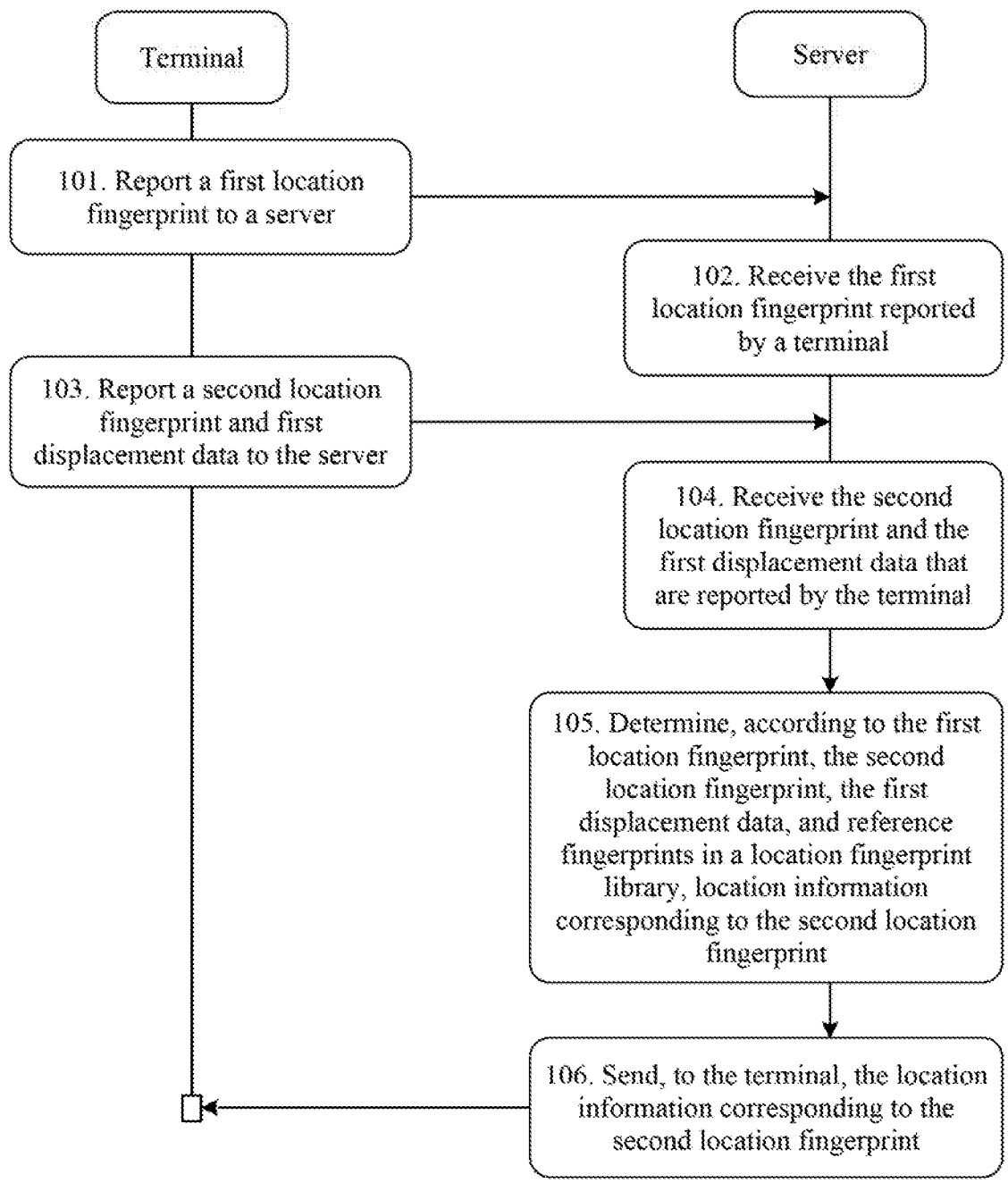
FIG. 2 is a schematic flowchart of a positioning method according to an embodiment of this application.

With reference to the communications system shown in FIG. 1, an embodiment of this application provides a positioning method. FIG. 2 is a schematic flowchart of the positioning method, and the method includes the following steps.

Step 101: A terminal reports a first location fingerprint to a server.

For ease of description, in the following content in this embodiment of this application, a location corresponding to the first location fingerprint is referred to as a first to-be-determined location. The first to-be-determined location means that the location is objectively determined, but neither the terminal nor the server determines location information of the first to-be-determined location. For a form of the first location fingerprint, refer to Table 1. No example is given herein for description any longer.

Step 102: The server receives the first location fingerprint reported by the terminal.

Step 103: The terminal reports a second location fingerprint and first displacement data to the server.

For ease of description, in the following content in this embodiment of this application, a location corresponding to the second location fingerprint is referred to as a second to-be-determined location. The first displacement data is used to represent displacement from the first to-be-determined location corresponding to the first location fingerprint to the second to-be-determined location corresponding to the second location fingerprint. Although the terminal does not determine location information of the first to-be-determined location and the second to-be-determined location, the terminal can determine, by using a sensor of the terminal, displacement from the first to-be-determined location to the second to-be-determined location, that is, the first displacement data.

Step 104: The server receives the second location fingerprint and the first displacement data that are reported by the terminal.

Step 105: The server determines, according to the first location fingerprint, the second location fingerprint, the first displacement data, and reference fingerprints in a location fingerprint library, location information corresponding to the second location fingerprint.

The location information corresponding to the second location fingerprint is location information of the second to-be-determined location. In this embodiment of this application, the server may use at least two policies to determine the location information of the second to-be-determined location. The at least two policies include:

Policy 1: The server matches the first location fingerprint and the reference fingerprints in the location fingerprint library, to determine M reference fingerprints, where a degree of matching between the M reference fingerprints and the first location fingerprint is highest. The server uses reference points corresponding to the M reference fingerprints as a set of location points closest to the first to-be-determined location. The set may be referred to as a first location set.

Then, the location points in the first location set are displaced according to the first displacement data, to obtain a second location set. Because each location point in the second location set is obtained by displacing the location point in the first location set, M location points in the second location set are referred to as M end points, and correspondingly, M location points in the first location set are referred to as M start points.

Assuming that the first to-be-determined location is an $i^{th}$ start point in the M start points, the second to-be-determined location should be accordingly an $i^{th}$ end point obtained after the $i^{th}$ start point is displaced. Therefore, a degree of matching (referred to as an $i^{th}$ start point matching degree in this embodiment of this application) between a location fingerprint (a reference fingerprint) corresponding to the $i^{th}$ start point and the first location fingerprint is calculated, and a degree of matching (referred to as an $i^{th}$ end point matching degree in this embodiment of this application) between a location fingerprint corresponding to the $i^{th}$ end point and the second location fingerprint is calculated. A degree of proximity of the $i^{th}$ end point to the second to-be-determined location may be measured by comprehensively considering the $i^{th}$ start point matching degree and the $i^{th}$ end point matching degree. Likewise, a degree of proximity of the $i^{th}$ start point to the first to-be-determined location may also be measured by comprehensively considering the $i^{th}$ start point matching degree and the $i^{th}$ end point matching degree.

According to the policy 1, one or more end points closest to the second to-be-determined location may be determined from the M end points, and the location information of the second to-be-determined location is determined according to the one or more end points closest to the second to-be-determined location.

Policy 2: The server obtains the first location set and the second location set in the manner in the policy 1. Then, the server matches the second location fingerprint and the reference fingerprints in the location fingerprint library, to determine M reference fingerprints, where a degree of matching between the M reference fingerprints and the second location fingerprint is highest. The server uses reference points corresponding to the M reference fingerprints as a set of location points closest to the second to-be-determined location. The set is referred to as a third location set.

Assuming that the first to-be-determined location is an $i^{th}$ start point in the M start points, the second to-be-determined location should be accordingly an $i^{th}$ end point obtained after the $i^{th}$ start point is displaced. In this case, the $i^{th}$ end point is in the third location set, or is close enough to a point in the third location set. Therefore, degrees of proximity of the points in the third location set to points in the second location set are measured to determine one or more location points closest to the second to-be-determined location. For example, a point is separately selected from the second location set and the third location set randomly, and a distance between the two points is calculated. After all cases are traversed, it is determined that a distance between a location point A in the second location set and a location point B in the third location set is shortest. In this case, it may be determined that the location point A and/or the location point B are/is a location point closest to the second to-be-determined location. The location information of the second to-be-determined location may be determined according to the location point A and/or the location point B.

A possible variation of the policy 2 is as follows: The location points in the third location set are reversely displaced by using the first displacement data, to obtain a fourth location set. Then, one or more location points close to the second to-be-determined location are determined according to degrees of proximity of the location points in the first location set to location points in the fourth location set, and the location information of the second to-be-determined location is determined according to these location points. An implementation of the variation is similar to that in the policy 2, and is not repeated herein again.

In the foregoing technical solution, the server determines, according to the first location fingerprint, the second location fingerprint, and the first displacement data that are reported by the terminal, the location information corresponding to the second location fingerprint, where the first displacement data is used to represent the displacement from the location corresponding to the first location fingerprint to the location corresponding to the second location fingerprint. The location information of the location corresponding to the second location fingerprint is determined with reference to matching results of location fingerprints at two locations. Therefore, impact, on positioning precision, of fluctuation of a location fingerprint detected by the terminal at a single location is reduced, and positioning precision is improved.

In addition, in this embodiment of this application, when performing matching on the second location fingerprint in the policy 1, the server does not need to compare the second location fingerprint with all the reference fingerprints in the location fingerprint library, but matches the second location fingerprint and the location fingerprints corresponding to the M end points. Generally, M is far smaller than a quantity of reference fingerprints in the location fingerprint library. Therefore, in the technical solution in the policy 1, an amount of calculation for performing matching on the second location fingerprint is relatively small, and a time consumed for the matching is relatively short.

It should be noted that, in this embodiment of this application, the server may be a single computing device, or may be a cluster or a platform that includes multiple computing devices. In addition, the location fingerprint library may be stored in a storage unit of the server, or may be stored in another device. When matching fingerprints, the server obtains data in the location fingerprint library from a device that stores the location fingerprint library.

Figure 3:
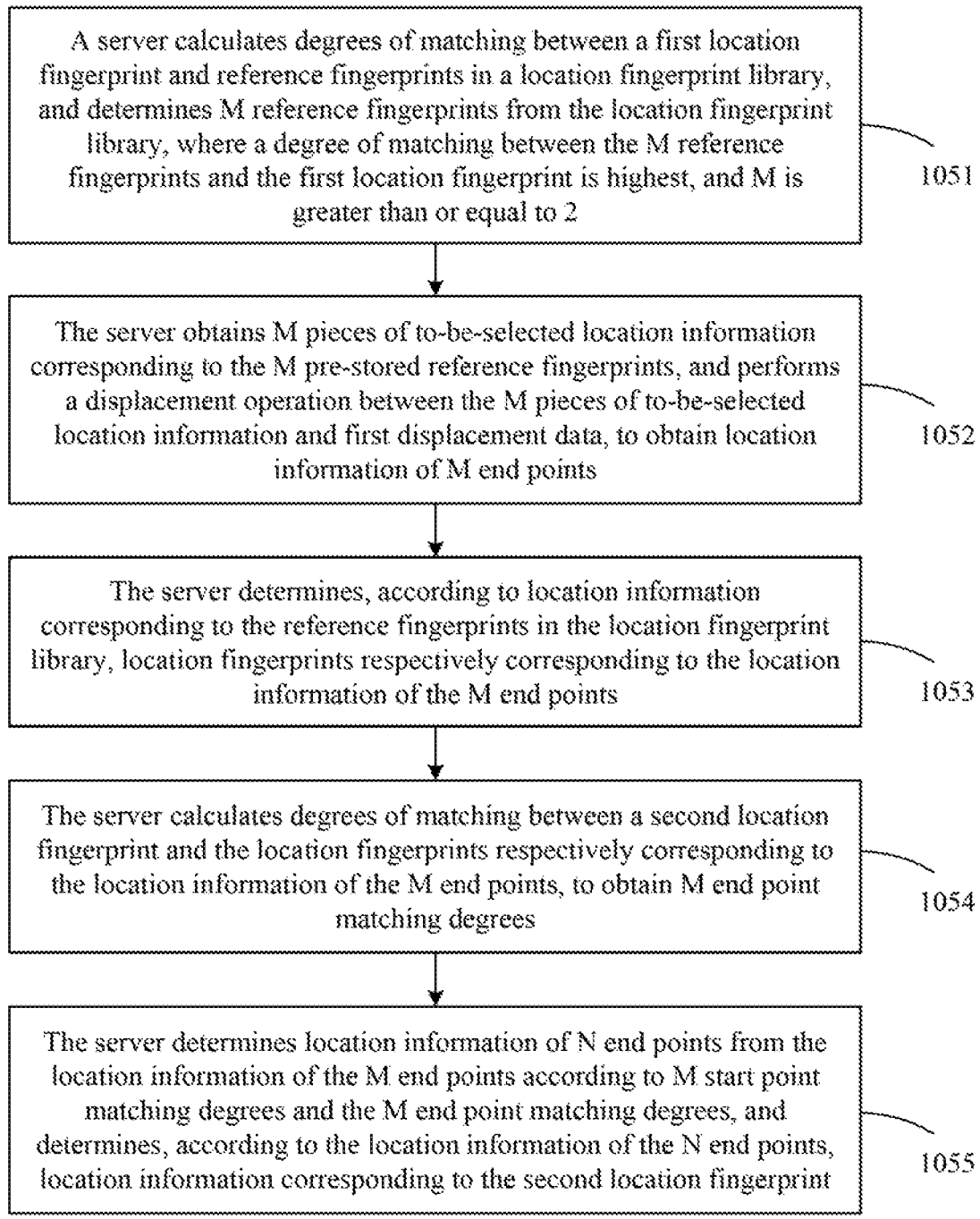
FIG. 3 is another schematic flowchart of a positioning method according to an embodiment of this application.

The following describes in detail the positioning method provided in this embodiment of this application with reference to the policy 1. Referring to FIG. 3, an implementation of step 105 may include the following steps.

Step 1051: The server calculates degrees of matching between the first location fingerprint and the reference fingerprints in the location fingerprint library, and determines M reference fingerprints from the location fingerprint library, where a degree of matching between the M reference fingerprints and the first location fingerprint is highest, and M is greater than or equal to 2.

The M reference fingerprints mean that the degrees of matching between the first location fingerprint and the reference fingerprints in the location fingerprint library are calculated, the matching degrees obtained by means of calculation are sorted in descending order, the first M matching degrees in the sorting are determined, and reference fingerprints corresponding to the M matching degrees are the M reference fingerprints, where the degree of matching between the M reference fingerprints and the first location fingerprint is highest. A set of M location points corresponding to the M reference fingerprints is the first location set described above. The first location set may be represented as $\{P_1(i)\}$, where $P_1(i)$ represents a location point corresponding to an $i^{th}$ reference fingerprint in the M reference fingerprints, that is, the $i^{th}$ start point described above.

In this embodiment of this application, M is an integer not less than 2. Specific data of M may be a preset default value, or may be data specified by a user. When M is relatively large, positioning precision is relatively high; when M is relatively small, a time consumed for positioning calculation is relatively short.

Step 1052: The server obtains M pieces of to-be-selected location information corresponding to the M prestored reference fingerprints, and performs a displacement operation between the M pieces of to-be-selected location information and the first displacement data, to obtain location information of M end points.

The M pieces of to-be-selected location information are location information of the M location points in the first location set, that is, location information of M start points.

The M start points are displaced according to the first displacement data, to obtain M end points. An $i^{th}$ end point is a location point obtained after the $i^{th}$ start point $P_1(i)$ is displaced according to the first displacement data, and is represented as $P_2(i)$. A set of the M end points is the second location set described above, and is represented as $\{P_2(i)\}$.

Step 1053: The server determines, according to location information corresponding to the reference fingerprints in the location fingerprint library, location fingerprints respectively corresponding to the location information of the M end points.

For any end point in the M end points, if the end point overlaps with a reference point in the location fingerprint library, a location fingerprint corresponding to location information of the end point is a reference fingerprint corresponding to the reference point.

If the end point does not overlap with any reference point, the location fingerprint corresponding to the location information of the end point may be determined according to reference fingerprints at one or more reference points closest to the end point. For example, the server determines a reference point closest to the end point, and uses a reference fingerprint at the reference point closest to the end point as the location fingerprint of the end point. For another example, the server determines multiple reference points closest to the end point, obtains a location fingerprint by means of calculation according to reference fingerprints at the multiple reference points closest to the end point, and uses the location fingerprint obtained by means of calculation as the location fingerprint of the end point. For a manner of calculating, according to the reference fingerprints at the multiple reference points close to the terminal, the location fingerprint corresponding to the location information of the end point, refer to existing technical means. Details are not described in this embodiment of this application.

In a possible implementation of step 1053, there is an end point, in the M end points, that is beyond a boundary range of the location fingerprint library. In this case, the server may remove the end point from the second location set, and does not use the end point as data for calculating the location information corresponding to the second location fingerprint.

In another possible implementation of step 1053, when there is an end point, in the M end points, that is beyond a boundary range of the location fingerprint library, the server first determines a shortest distance between the end point and a reference point in the location fingerprint library. If the shortest distance is not greater than a threshold, the server uses a reference fingerprint of a reference point as a location fingerprint corresponding to the end point, where a distance between the reference point and the end point is shortest; if the shortest distance is greater than the threshold, the server removes the end point from the second location set.

Step 1054: The server calculates degrees of matching between the second location fingerprint and the location fingerprints respectively corresponding to the location information of the M end points, to obtain M end point matching degrees.

Step 1055: The server determines location information of N end points from the location information of the M end points according to M start point matching degrees and the M end point matching degrees, and determines, according to the location information of the N end points, the location information corresponding to the second location fingerprint.

For ease of description, an $i^{th}$ start point matching degree in the M start point matching degrees is represented as $S_1$ (i), that is, a degree of matching between an $i^{th}$ start point and the first location fingerprint. An $i^{th}$ end point matching degree in the M end point matching degrees is represented as $S_2$ (i).

There may be multiple implementations of determining the location information of the N end points from the location information of the M end points in step 1055. The multiple implementations include but are not limited to the following manners:

Manner 1: Q largest matching degrees are obtained from the M start point matching degrees, P largest matching degrees are obtained from the M end point matching degrees, an intersection set (N end points) between end points corresponding to the Q matching degrees and end points corresponding to the P matching degrees is obtained, and location information is determined from location information of the end points in the intersection set.

For example, six largest matching degrees: $S_1$ (1), $S_1$ (2), $S_1$ (4), $S_1$ (5), $S_{=1}$ (8), and $S_1$ (10) are determined from the M start point matching degrees $S_1$ (1) to $S_1$ (M). Further, a set of end point matching degrees corresponding to the six largest start point matching degrees is determined, that is, {$S_2$ (1), $S_2$ (2), $S_2$ (4), $S_2$ (5), $S_2$ (8), and $S_2$ (10)}, and a set of six largest matching degrees is determined from the M end point matching degrees $S_2$ (1) to $S_2$ (M), that is {$S_2$ (1), $S_2$ (2), $S_2$ (3), $S_2$ (5), $S_2$ (7), and $S_2$ (8)}. Apparently, an intersection set of the two sets is {$S_2$ (1), $S_2$ (2), $S_2$ (5), $S_2$ (8)}. Therefore, the location information of the N end points is location information corresponding to the first, the second, the fifth, and the eighth end points in the M end points.

Manner 2: A degree of proximity of each of the M end points to the second to-be-determined location is measured, and measurement results are sorted. N end points are determined from the M end points, where a degree of proximity of the N end points to the second to-be-determined location is highest.

The server may measure a degree of proximity of an $i^{th}$ end point to the second to-be-determined location by using a function F(i) in which the $i^{th}$ start point matching degree $S_1$ (i) and the $i^{th}$ end point matching degree $S_2$ (i) are used as independent variables. The function F(i) may be represented as:

F(i)=f($x_1$, $x_2$), where $x_1$=$S_1$ (i), and $x_2$=$S_2$ (i).

The function f(x1, x2) has multiple implementation forms, for example, $$f(x_1, x_2) = \frac{x_1 + x_2}{2};$$

for another example, f ($x_1$, $x_2$)=$\sqrt{x_1^2+x_2^2}$; for still another example, f ($x_1$, $x_2$)=$e^{x_1}+e^{x_1}$. More implementations of f($x_1$, $x_2$) are not exhaustively listed in this embodiment of this application.

The function f($x_1$, $x_2$) has a consistent monotonicity for $x_1$ and $x_2$. That is, when f($x_1$, $x_2$) is an increasing function of $x_1$, f($x_1$, $x_2$) is an increasing function of $x_2$; when f($x_1$, $x_2$) is a decreasing function of $x_1$, f($x_1$, $x_2$) is a decreasing function of $x_2$. When f($x_1$, $x_2$) is an increasing function of $x_1$ and $x_2$, a larger value of F(i) indicates that the $i^{th}$ end point is closer to the second to-be-determined location. On the contrary, when f($x_1$, $x_2$) is an increasing function of $x_1$ and $x_2$, a smaller value of F(i) indicates that the $i^{th}$ end point is closer to the second to-be-determined location.

M values: from F(1) to F(M) are obtained by means of the foregoing calculation. Because F(i) represents the degree of proximity of the $i^{th}$ end point to the second to-be-determined location, N end points closest to the second to-be-determined location may be determined from the M end points according to F(1) to F(M). N is a positive integer less than M.

After determining the location information of the N end points from the location information of the M end points, the server may determine the location information of the second to-be-determined location according to the location information of the N terminals. For example, when N=1, it is determined that the location information of the second to-be-determined location is location information of an end point closest to the second to-be-determined location. For another example, when N is greater than 1, the server may determine location information of a center point of a circumscribed circle or a circumscribed rectangle of the N end points as the location information of the second to-be-determined location. For another example, when N is greater than 1, the server may calculate an arithmetic mean or a geometric mean of coordinates of the N end points, and use coordinate information determined by means of the calculation as the location information of the second location. For another example, weighting is performed on the location information of the N end points with reference to a degree of proximity of each of the N end points to the second to-be-determined location. A weighting coefficient of an end point having a high degree of proximity to the second to-be-determined location is relatively large. Location information formed after the weighting is used as the location information of the second to-be-determined location.

In the foregoing technical solution, the M start point matching degrees and the M end point matching degrees respectively reflect fingerprint matching results of the first location fingerprint and fingerprint matching results of the second location fingerprint. The location information of the N end points is determined from the location information of the M end points according to the M start point matching degrees and the M end point matching degrees, and the location information of the second to-be-determined location is determined according to the location information of the N end points. Therefore, impact of fluctuation of the second location fingerprint on positioning precision may be reduced, and positioning precision may be improved.

Optionally, with reference to the manner 2 in step 1055, the server calculates M weighted sums according to the M start point matching degrees and the M end point matching degrees. An $i^{th}$ weighted sum in the M weighted sums is a sum of a weight of the $i^{th}$ start point matching degree in the M start point matching degrees and the $i^{th}$ end point matching degree in the M start point matching degrees. Then, the server determines N largest weighted sums from the M weighted sums according to the M weighted sums, and uses, as location information, that is, the location information of the N end points that is used to determine the location information of the second to-be-determined location, location information that is in the location information of the M end points and that is corresponding to location fingerprints of the N end points used to obtain the N weighted sums.

The function F(i) is still used to represent the degree of proximity of the $i^{th}$ end point to the second to-be-determined location, and $F(i)=a*S_1(i)+b*S_1(i)$, where a and b may be constants, or a and b may be functions of i; a*b should be greater than 0. When both a and b are positive values, the N largest weighted sums are determined from the M weighted sums, and the N end points, in the M end points, that are used to calculate the N weighted sums are determined. The N end points are N end points closest to the second to-be-determined location. When both a and b are negative values, N smallest weighted sums are determined from the M weighted sums, and the N end points, in the M end points, that are used to calculate the N weighted sums are determined. The N end points are the N end points closest to the second to-be-determined location.

In the foregoing technical solution, the weighted sums of the M start point matching degrees and the M end point matching degrees may reflect a degree of proximity of each end point to the second to-be-determined location, the N end points closest to the second to-be-determined location are determined according to the weighted sums, and the location information of the second to-be-determined location is determined according to the location information of the N end points. Therefore, impact of fluctuation of the second location fingerprint on positioning of the second to-be-determined location may be reduced, and positioning precision may be improved. In addition, the calculation for calculating the M weighted sums and determining the N weighted sums from the M weighted sums is relatively simple, an amount of calculation is small, and a time consumed for the calculation is short.

Optionally, in all the foregoing possible implementations in this embodiment of this application, in addition to determining the location information corresponding to the second location fingerprint, the server may determine location information corresponding to the first location fingerprint. For example, the server may reversely displace the determined second to-be-determined location by using the first displacement data, and use location information of a location point obtained after the displacement as the location information of the first to-be-determined location. For another example, after determining the N end points closest to the second to-be-determined location, the server may accordingly determine N start points closest to the first to-be-determined location. Then, the server determines the location information of the first to-be-determined location according to the N start points closest to the first to-be-determined location.

Optionally, in this embodiment of this application, the server may perform positioning based on matching results of location fingerprints at three locations at three locations. For example, the terminal reports a third location fingerprint, the first location fingerprint, second displacement data, the second location fingerprint, and the first displacement data to the server. The second displacement data is displacement from a location corresponding to the third location fingerprint to the location corresponding to the first location fingerprint. The server determines, according to the third location fingerprint, the first location fingerprint, the second displacement data, the second location fingerprint, the first displacement data, and the reference fingerprints in the location fingerprint library, the location information corresponding to the second location fingerprint.

It may as well be assumed that the terminal is displaced from the location (the second to-be-determined location) corresponding to the second location fingerprint to a fourth to-be-determined location. A fourth location fingerprint is collected at the fourth to-be-determined location, and the fourth location fingerprint and recorded third displacement data that represents displacement from the second to-be-determined location to the fourth to-be-determined location are sent to the server. The following describes an implementation in which the server determines, according to the first location fingerprint, the second location fingerprint, the first displacement data, the fourth location fingerprint, the third displacement data, and the reference fingerprints in the location fingerprint library, location information corresponding to the fourth to-be-determined location.

Figure 4:
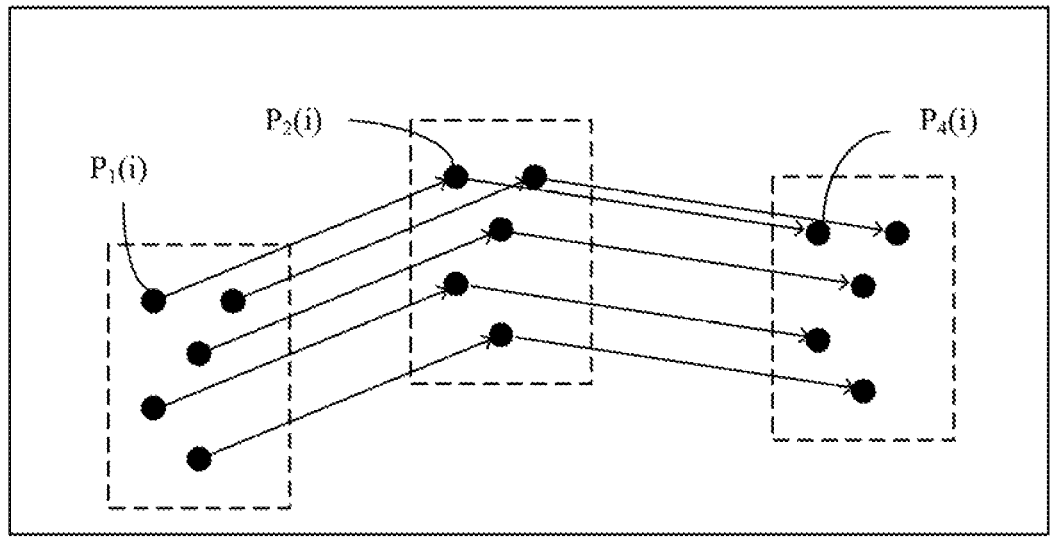
FIG. 4 is a schematic diagram of performing displacement on a location set according to an embodiment of this application.

The server may determine the location information of the fourth to-be-determined location by using a variation based on the policy 1. After obtaining the first location set and the second location set in the manner described above, referring to FIG. 4, the server displaces the M points in the second location set according to the third displacement data, to obtain a fourth location set that is represented as $\{P_4(i)\}$. An $i^{th}$ location point $P_4(i)$ in the fourth location set is obtained after an $i^{th}$ point $P_2(i)$ in the second location set is displaced.

Then, the server calculates a degree of matching between each location point in the fourth location set and the fourth location fingerprint. A degree of matching between the location point $P_4(i)$ in the fourth location set and the fourth location fingerprint is represented as $S_4(i)$.

Next, the server determines, according to $S_1(i)$, $S_2(i)$, and $S_4(i)$, N points in the fourth location set that are closest to the fourth to-be-determined location, and determines the location information of the fourth to-be-determined location according to location information of the N points.

For the manner of determining, according to $S_1(i)$, $S_2(i)$, and $S_4(i)$, N points in the third location set that are closest to the third to-be-determined location, refer to the foregoing multiple implementations of determining the N end points closest to the second to-be-determined location according to the M start point matching degrees and the M end point matching degrees.

Based on the technical solution provided in this embodiment of this application, the server may also determine the location information of the terminal according to three location fingerprints and data of displacement between locations corresponding to the location fingerprints and by using a variation based on the policy 2. In addition, the server may also determine the location information of the terminal according to more than three location fingerprints and data of displacement between locations corresponding to the location fingerprints. According to the foregoing description, a specific implementation of determining the location information of the terminal can be learned of by a person skilled in the art, and is not repeated herein again.

In the foregoing technical solution, the server may determine the location information of the terminal according to three or more location fingerprints and data of displacement between locations. Therefore, impact, on positioning, of fluctuation of a single location fingerprint detected by the terminal is reduced, and positioning precision is improved.

Optionally, in this embodiment of this application, after determining the location information of the terminal, the server sends the location information of the terminal to the terminal, so that the terminal can learn of a location of the terminal.

For example, after step 105, the method further includes step 106: The server sends, to the terminal, the location information corresponding to the second location fingerprint, so that the terminal learns of the location information of the location corresponding to the second location fingerprint.

After receiving the location information of the second to-be-determined location, the terminal may provide a service for a user based on the location information of the second to-be-determined location. For example, the terminal displays the location information of the second to-be-determined location in a map application, or performs punching in a location based service (English: location based service, LBS) application.

It should be noted that the server may not send the location information of the second to-be-determined location to the terminal. For example, when a user of the location information of the terminal is the server, the server may use the determined location information of the second to-be-determined location, and may not send the location information of the second to-be-determined location to the terminal.

Optionally, in this embodiment of this application, the terminal actively reports, to the server at an interval of a time period, a location fingerprint and displacement data that are collected by the terminal.

Optionally, in this embodiment of this application, the server sends an instruction to the terminal at an interval of a time period. After receiving the instruction, the terminal reports a collected location fingerprint and collected displacement data to the server according to the instruction.

It should be noted that the positioning method in this embodiment of this application is not only applied to indoor positioning, but also may be applied to outdoor positioning.

Figure 5:
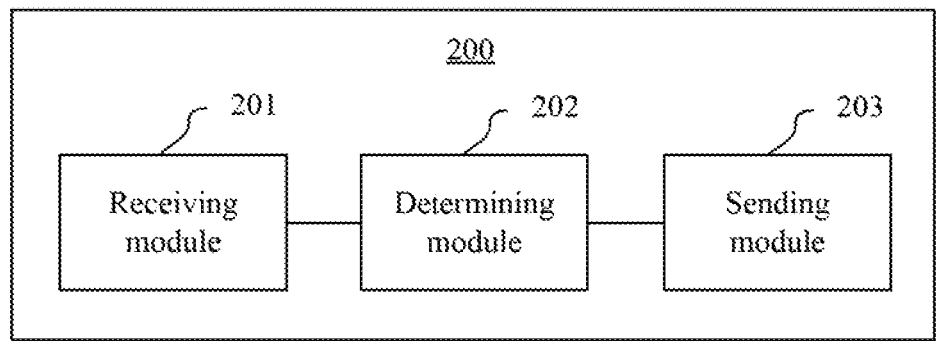
FIG. 5 is a schematic diagram of a positioning server 200 according to an embodiment of this application.

An embodiment of this application further provides a positioning server 200. Referring to FIG. 5, the positioning server 200 includes:

a receiving module 201, configured to: receive a first location fingerprint reported by a terminal, and receive a second location fingerprint and first displacement data that are reported by the terminal, where the first displacement data is used to represent displacement from a location corresponding to the first location fingerprint to a location corresponding to the second location fingerprint; and a determining module 202, configured to determine, according to the first location fingerprint, the second location fingerprint, the first displacement data, and reference fingerprints in a location fingerprint library, location information corresponding to the second location fingerprint.

Optionally, in this embodiment, the determining module 202 is configured to:

calculate degrees of matching between the first location fingerprint and the reference fingerprints in the location fingerprint library, and determine M reference fingerprints from the location fingerprint library, where a degree of matching between the M reference fingerprints and the first location fingerprint is highest, and M is an integer greater than or equal to 2;

obtain M pieces of to-be-selected location information corresponding to the M prestored reference fingerprints;

perform a displacement operation between the M pieces of to-be-selected location information and the first displacement data, to obtain location information of M end points;

determine, according to location information corresponding to the reference fingerprints in the location fingerprint library, location fingerprints respectively corresponding to the location information of the M end points;

calculate degrees of matching between the second location fingerprint and the location fingerprints respectively corresponding to the location information of the M end points, to obtain M end point matching degrees;

determine location information of N end points from the location information of the M end points according to M start point matching degrees and the M end point matching degrees, where the M start point matching degrees are degrees of matching between the first location fingerprint and the M reference fingerprints, and N is a positive integer less than M; and determine, according to the location information of the N end points, the location information corresponding to the second location fingerprint.

Optionally, in this embodiment, the determining module 202 is configured to:

calculate M weighted sums according to the M start point matching degrees and the M end point matching degrees, where an $i^{th}$ weighted sum in the M weighted sums is a sum of a weight of an $i^{th}$ start point matching degree in the M start point matching degrees and a weight of an $i^{th}$ end point matching degree in the M end point matching degrees, the $i^{th}$ start point matching degree is a degree of matching between the first location fingerprint and an $i^{th}$ reference fingerprint in the M reference fingerprints, the $i^{th}$ end point matching degree is a degree of matching between the second location fingerprint and a location fingerprint corresponding to location information of an $i^{th}$ end point in the location information of the M end points, the location information of the $i^{th}$ end point is location information of an end point that is obtained after the displacement operation is performed between the M pieces of to-be-selected location information and the first displacement data, and i is a positive integer less than or equal to M; and determine N largest weighted sums from the M weighted sums according to the M weighted sums, and use, as the location information of the N end points, location information that is in the location information of the M end points and that is corresponding to location fingerprints of the N end points used to obtain the N weighted sums.

Optionally, in this embodiment, the receiving module 201 is further configured to receive a third location fingerprint and second displacement data that are reported by the terminal, where the second displacement data is used to represent displacement from a location corresponding to the third location fingerprint to the location corresponding to the first location fingerprint.

Correspondingly, the determining module 202 is configured to determine, according to the first location fingerprint, the second location fingerprint, the first displacement data, the third location fingerprint, the second displacement data, and the reference fingerprints in the location fingerprint library, the location information corresponding to the second location fingerprint.

Optionally, in this embodiment, the positioning server 200 further includes:

a sending module 203, configured to send, to the terminal, the location information corresponding to the second location fingerprint.

For specific implementations of modules included in the positioning server 200, refer to corresponding steps performed by the server in the embodiments of FIG. 2 and FIG. 3. Details are not described again in this embodiment of this application.

Figure 6:
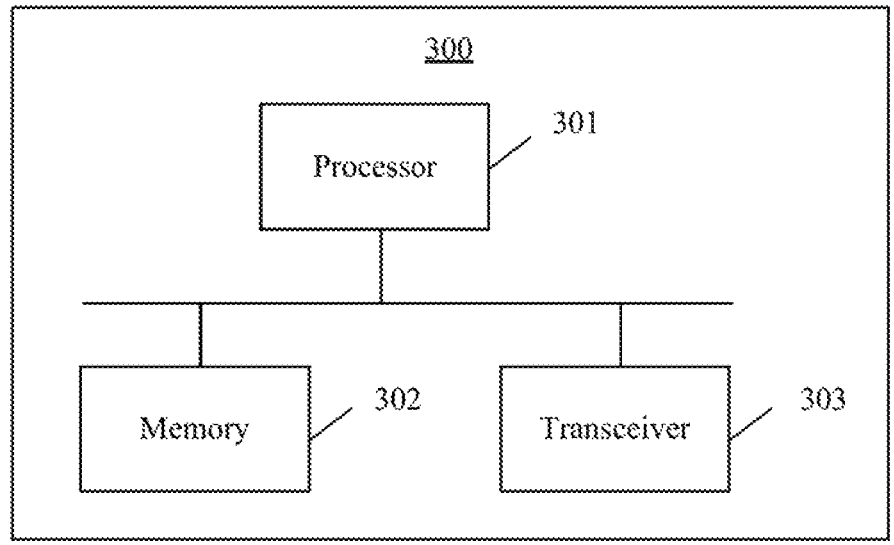
FIG. 6 is a schematic diagram of a positioning server 300 according to an embodiment of this application.

An embodiment of this application further provides a positioning server 300. Referring to FIG. 6, the positioning server 300 includes a processor 301, and a memory 302 and a transceiver 303 that are coupled to the processor 301.

The memory 302 is configured to store a location fingerprint library.

The transceiver 303 is configured to receive a first location fingerprint, a second location fingerprint, and first displacement data that are reported by a terminal, where the first displacement data is used to represent displacement from a location corresponding to the first location fingerprint to a location corresponding to the second location fingerprint.

The processor 301 is configured to determine, according to the first location fingerprint, the second location fingerprint, the first displacement data, and reference fingerprints in a location fingerprint library, location information corresponding to the second location fingerprint.

Optionally, in this embodiment, that the processor 301 is configured to determine, according to the first location fingerprint, the second location fingerprint, the first displacement data, and reference fingerprints in a location fingerprint library, location information corresponding to the second location fingerprint includes:

calculating degrees of matching between the first location fingerprint and the reference fingerprints in the location fingerprint library, and determining M reference fingerprints from the location fingerprint library, where a degree of matching between the M reference fingerprints and the first location fingerprint is highest, and M is an integer greater than or equal to 2;

obtaining M pieces of to-be-selected location information corresponding to the M prestored reference fingerprints;

performing a displacement operation between the M pieces of to-be-selected location information and the first displacement data, to obtain location information of M end points;

determining, according to location information corresponding to the reference fingerprints in the location fingerprint library, location fingerprints respectively corresponding to the location information of the M end points;

calculating degrees of matching between the second location fingerprint and the location fingerprints respectively corresponding to the location information of the M end points, to obtain M end point matching degrees;

determining location information of N end points from the location information of the M end points according to M start point matching degrees and the M end point matching degrees, where the M start point matching degrees are degrees of matching between the first location fingerprint and the M reference fingerprints, and N is a positive integer less than M; and determining, according to the location information of the N end points, the location information corresponding to the second location fingerprint.

Optionally, in this embodiment, that the processor 301 is configured to determine location information of N end points from the location information of the M end points according to M start point matching degrees and the M end point matching degrees includes:

calculating M weighted sums according to the M start point matching degrees and the M end point matching degrees, where an $i^{th}$ weighted sum in the M weighted sums is a sum of a weight of an $i^{th}$ start point matching degree in the M start point matching degrees and a weight of an $i^{th}$ end point matching degree in the M end point matching degrees, the $i^{th}$ start point matching degree is a degree of matching between the first location fingerprint and an $i^{th}$ reference fingerprint in the M reference fingerprints, the $i^{th}$ end point matching degree is a degree of matching between the second location fingerprint and a location fingerprint corresponding to location information of an $i^{th}$ end point in the location information of the M end points, the location information of the $i^{th}$ end point is location information of an end point that is obtained after the displacement operation is performed between the M pieces of to-be-selected location information and the first displacement data, and i is a positive integer less than or equal to M; and determining N largest weighted sums from the M weighted sums according to the M weighted sums, and using, as the location information of the N end points, location information that is in the location information of the M end points and that is corresponding to location fingerprints of the N end points used to obtain the N weighted sums.

Optionally, in this embodiment, the transceiver 303 is further configured to receive a third location fingerprint and second displacement data that are reported by the terminal, where the second displacement data is used to represent displacement from a location corresponding to the third location fingerprint to the location corresponding to the first location fingerprint.

Correspondingly, that the processor 301 is configured to determine, according to the first location fingerprint, the second location fingerprint, the first displacement data, and reference fingerprints in a location fingerprint library, location information corresponding to the second location fingerprint includes: determining, according to the first location fingerprint, the second location fingerprint, the first displacement data, the third location fingerprint, the second displacement data, and the reference fingerprints in the location fingerprint library, location information corresponding to the third location fingerprint.

Optionally, in this embodiment, the transceiver 303 is further configured to send, to the terminal, the location information corresponding to the second location fingerprint.

The processor 301 may be a processing element, or may be a general term of multiple processing elements. For example, the processor 301 may be a central processing unit (English: central processing unit, CPU), or may be an application-specific integrated circuit (English: application specific intergrated circuit, ASIC), or may be configured as one or more integrated circuits for implementing this embodiment of this application, for example, one or more microprocessors (English: digital signal processor, DSP) or one or more field programmable gate arrays (English: field programmable gate array, FPGA).

The memory 302 may be a storage element, or may be a general term of multiple storage elements. The memory 302 is configured to store executable program code, or a parameter, data, and the like that are required for running of the server. In addition, the memory 302 may include a random access memory (English: random-access memory, RAM), or may include a non-volatile memory (English: non-volatile memory, NVM) such as a disk memory or a flash memory (English: flash memory).

The transceiver 303 may include an antenna and a radio frequency module.

For specific implementations of hardware modules included in the positioning server 300, refer to corresponding steps performed by the server in the embodiments of FIG. 2 and FIG. 3. Details are not described again in this embodiment of this application.

Figure 7:
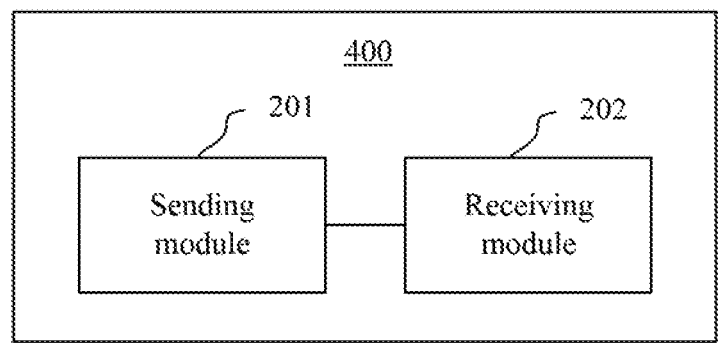
FIG. 7 is a schematic diagram of a terminal 400 according to an embodiment of this application.

An embodiment of this application further provides a terminal 400. Referring to FIG. 7, the terminal 400 includes:

a sending module 401, configured to: report a first location fingerprint to a server, and report a second location fingerprint and first displacement data to the server, where the first displacement data is used to represent displacement from a location corresponding to the first location fingerprint to a location corresponding to the second location fingerprint; and a receiving module 402, configured to receive location information that is corresponding to the second location fingerprint and that is sent by the server, where the location information corresponding to the second location fingerprint is location information determined by the server according to the first location fingerprint, the second location fingerprint, the first displacement data, and reference fingerprints in a location fingerprint library.

In a possible implementation, before the sending module 401 reports the second location fingerprint and the first displacement data to the server, the receiving module 402 is further configured to:

receive an instruction that is sent by the server and that is used to instruct to upload a location fingerprint and displacement data to the server.

For specific implementations of modules included in the terminal 400, refer to corresponding steps performed by the terminal in the embodiments of FIG. 2 and FIG. 3. Details are not described again in this embodiment of this application.

Figure 8:
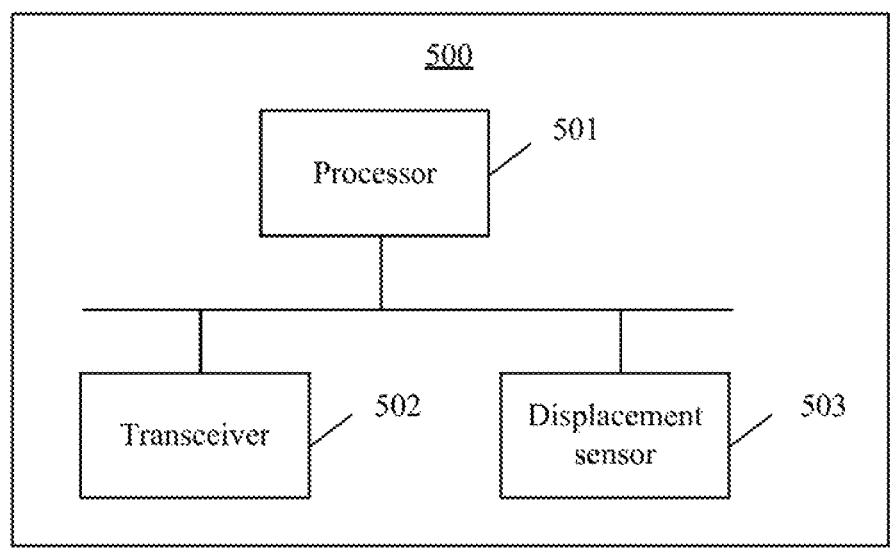
FIG. 8 is a schematic diagram of a terminal 500 according to an embodiment of this application.

An embodiment of this application further provides a terminal 500. Referring to FIG. 8, the terminal 500 includes a processor 501, and a transceiver 502 and a displacement sensor 503 that are coupled to the processor 501.

The processor 501 is configured to generate a first location fingerprint.

The transceiver 502 is configured to send the first location fingerprint to a server.

The processor 501 is further configured to generate a second location fingerprint.

The displacement sensor 503 is configured to generate first displacement data used to represent displacement from a location corresponding to the first location fingerprint to a location corresponding to the second location fingerprint.

The transceiver 502 is further configured to: send the second location fingerprint and the first displacement data to the server, and receive location information that is corresponding to the second location fingerprint and that is sent by the server, where the location information corresponding to the second location fingerprint is location information determined by the server according to the first location fingerprint, the second location fingerprint, the first displacement data, and reference fingerprints in a location fingerprint library.

In a possible implementation, the transceiver 502 is further configured to receive an instruction that is sent by the server and that is used to instruct to upload a location fingerprint and displacement data to the server.

The processor 501 may be a processing element, or may be a general term of multiple processing elements. For example, the processor 501 may be a central processing unit (English: central processing unit, CPU), or may be an application-specific integrated circuit (English: application specific intergrated circuit, ASIC), or may be configured as one or more integrated circuits for implementing this embodiment of this application, for example, one or more microprocessors (English: digital signal processor, DSP) or one or more field programmable gate arrays (English: field programmable gate array, FPGA).

The transceiver 502 may include an antenna and a radio frequency module.

The displacement sensor 503 may be a sensor such as an acceleration sensor, a gyroscope, a magnetic compass, or the like that can record a displacement direction or a displacement distance of the terminal.

For specific implementations of hardware modules included in the positioning terminal 500, refer to corresponding steps performed by the terminal in the embodiments of FIG. 2 and FIG. 3. Details are not described again in this embodiment of this application.

An embodiment of this application further provides a computer readable medium, where the computer readable medium is configured to store a computer program. The computer program includes an instruction used to perform corresponding steps performed by the server in the embodiments of FIG. 2 and FIG. 3.

An embodiment of this application further provides a computer readable medium, where the computer readable medium is configured to store a computer program. The computer program includes an instruction used to perform corresponding steps performed by the terminal in the embodiments of FIG. 2 and FIG. 3.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A positioning method, comprising:
  receiving a first location fingerprint from a terminal, wherein the first location fingerprint corresponds to a first to-be-determined location;
  calculating degrees of matching between the first location fingerprint and a plurality of reference fingerprints in a location fingerprint library;
  determining a plurality of reference fingerprints of the plurality of reference fingerprints in the location fingerprint library, wherein degrees of matching between the plurality of reference fingerprints and the first location fingerprint are highest, wherein the plurality of reference fingerprints correspond to a first set of location points closest to the first to-be-determined location;
  receiving a second location fingerprint and first displacement data from the terminal, wherein the second location fingerprint corresponds to a second to-be-determined location, wherein the first displacement data represents a displacement distance from the first to-be-determined location to the second to-be-determined location;
  determining location fingerprints of a plurality of end points that are the displacement distance away from the first to-be-determined location, wherein the location fingerprint library includes the location fingerprints of the plurality of end points; and
  comparing the location fingerprints of the plurality of endpoints with the first location fingerprint to determine location information corresponding to the second location fingerprint by:
    obtaining a plurality of pieces of to-be-selected location information corresponding to the plurality of reference fingerprints;
    performing a displacement operation between the plurality of pieces of to-be-selected location information and the first displacement data to obtain the location information of the plurality of end points;
    calculating degrees of matching between the second location fingerprint and the location fingerprints of the plurality of end points to obtain a plurality of end point matching degrees;
    determining location information of a second plurality of end points from the location fingerprints of the plurality of end points according to a plurality of start point matching degrees and the plurality of end point matching degrees, wherein the plurality of start point matching degrees are degrees of matching between the first location fingerprint and the plurality of reference fingerprints; and
    determining the location information corresponding to the second location fingerprint according to the location information of the second plurality of end points.

2. The method of claim 1, wherein determining the location information of the plurality of end points from the location information of the plurality of end points according to the plurality of start point matching degrees and the plurality of end point matching degrees comprises:
  calculating a plurality of weighted sums according to the plurality of start point matching degrees and the plurality of end point matching degrees, wherein an $i^{th}$ weighted sum in the plurality of weighted sums is a sum of a weight of an $i^{th}$ start point matching degree in the plurality of start point matching degrees and a weight of an $i^{th}$ end point matching degree in the plurality of end point matching degrees, wherein the $i^{th}$ start point matching degree is a degree of matching between the first location fingerprint and an $i^{th}$ reference fingerprint in the plurality of reference fingerprints, wherein the $i^{th}$ end point matching degree is a degree of matching between the second location fingerprint and a location fingerprint corresponding to location information of an $i^{th}$ end point in the location information of the plurality of end points, wherein the location information of the $i^{th}$ end point is location information of an end point that is obtained after the displacement operation is performed between the plurality of pieces of to-be-selected location information and the first displacement data, and wherein i is a positive integer less than or equal to M;
  determining a plurality of largest weighted sums from the plurality of weighted sums according to the plurality of weighted sums; and
  using location information in the location information of the plurality of end points and that corresponds to location fingerprints of the plurality of end points used to obtain the plurality of weighted sums.

3. The method of claim 1, further comprising:
  receiving a third location fingerprint and second displacement data from the terminal, wherein the second displacement data represents a second displacement from a location corresponding to the third location fingerprint to the location corresponding to the first location fingerprint, and
  wherein determining the location information corresponding to the second location fingerprint comprises determining the location information corresponding to the second location fingerprint according to the first location fingerprint, the second location fingerprint, the first displacement data, the third location fingerprint, the second displacement data, and the reference fingerprints in the location fingerprint library.

4. The method of claim 1, wherein after determining the location information corresponding to the second location fingerprint, the method further comprises sending the location information corresponding to the second location fingerprint to the terminal.

5. A positioning server, comprising:
  a memory storing instructions; and
  a processor coupled to the memory and configured to execute the instructions, which cause the processor to be configured to:
    receive a first location fingerprint from a terminal, wherein the first location fingerprint corresponds to a first to-be-determined location;
    calculate degrees of matching between the first location fingerprint and a plurality of reference fingerprints in a location fingerprint library;
    determine a plurality of reference fingerprints of the plurality of reference fingerprints in the location fingerprint library, wherein degrees of matching between the plurality of reference fingerprints and the first location fingerprint are highest, wherein the plurality of reference fingerprints correspond to a first set of location points closest to the first to-be-determined location;
    receive a second location fingerprint and first displacement data from the terminal, wherein the second location fingerprint corresponds to a second to-bedetermined location, wherein the first displacement data represents a displacement distance from the first to-be-determined location to the second to-be-determined location;

determine location fingerprints of a plurality of end points that are the displacement distance away from the first to-be-determined location, wherein the location fingerprint library includes the location fingerprints of the plurality of end points;

compare the location fingerprint of the plurality of endpoints with the first location fingerprint;

obtain a plurality of pieces of to-be-selected location information corresponding to the plurality of reference fingerprints;

perform a displacement operation between the plurality of pieces of to-be-selected location information and the first displacement data to obtain the location information of the plurality of end points;

calculate degrees of matching between the second location fingerprint and the location fingerprints of the plurality of end points, to obtain plurality of end point matching degrees;

determine location information of a second plurality of end points from the location fingerprints of the plurality of end points according to a plurality of start point matching degrees and the plurality of end point matching degrees, wherein the plurality of start point matching degrees are degrees of matching between the first location fingerprint and the plurality of reference fingerprints; and determine the location information corresponding to the second location fingerprint according to the location information of the second plurality of end points.

6. The server of claim 5, wherein the instructions further cause the processor to be configured to:

calculate a plurality of weighted sums according to the plurality of start point matching degrees and the plurality of end point matching degrees, wherein an $i^{th}$ weighted sum in the plurality of weighted sums is a sum of a weight of an $i^{th}$ start point matching degree in the plurality of start point matching degrees and a weight of an $i^{th}$ end point matching degree in the plurality of end point matching degrees, wherein the $i^{th}$ start point matching degree is a degree of matching between the first location fingerprint and an $i^{th}$ reference fingerprint in the plurality of reference fingerprints, wherein the $i^{th}$ end point matching degree is a degree of matching between the second location fingerprint and a location fingerprint corresponding to location information of an $i^{th}$ end point in the location information of the plurality of end points, wherein the location information of the $i^{th}$ end point is location information of an end point that is obtained after the displacement operation is performed between the plurality of pieces of to-be-selected location information and the first displacement data, and wherein i is a positive integer less than or equal to M;

determine a plurality of largest weighted sums from the plurality of weighted sums according to the plurality of weighted sums; and use location information in the location information of the plurality of end points and that corresponds to location fingerprints of the plurality of end points used to obtain the plurality of weighted sums.

7. The server of claim 5, wherein the instructions further cause the processor to be configured to:

receive a third location fingerprint and second displacement data from the terminal, wherein the second displacement data represents displacement from a location corresponding to the third location fingerprint to the location corresponding to the first location fingerprint; and correspondingly determine the location information corresponding to the second location fingerprint according to the first location fingerprint, the second location fingerprint, the first displacement data, the third location fingerprint, the second displacement data, and the reference fingerprints in the location fingerprint library.

8. The server of claim 5, wherein the instructions further cause the processor to be configured to send the location information corresponding to the second location fingerprint to the terminal.

9. A positioning method, comprising:

reporting a first location fingerprint to a server, wherein the first location fingerprint corresponds to a first to-be-determined location;

reporting a second location fingerprint and first displacement data to the server, wherein the second location fingerprint corresponds to a second to-be-determined location, wherein the first displacement data represents a displacement distance from the first to-be-determined location to the second to-be-determined location; and receiving location information corresponding to the second location fingerprint from the server, wherein a location fingerprint library includes the location fingerprints of the plurality of end points, wherein the location information corresponding to the second location fingerprint is based on a comparison between the first location fingerprint and location fingerprints of a plurality of endpoints that are the displacement distance away from the first to-be-determined location, and wherein to determine the location information corresponding to the second location fingerprint:

a plurality of pieces of to-be-selected location information corresponding to the plurality of reference fingerprints is obtained, a displacement operation is performed between the plurality of pieces of to-be-selected location information and the first displacement data to obtain the location information of the plurality of end points, degrees of matching between the second location fingerprint and the location fingerprints of the plurality of end points are determined to obtain a plurality of end point matching degrees, location information of a second plurality of end points is determined from the location fingerprints of the plurality of end points according to a plurality of start point matching degrees and the plurality of end point matching degrees, wherein the plurality of start point matching degrees are degrees of matching between the first location fingerprint and the plurality of reference fingerprints, and the location information corresponding to the second location fingerprint is determined according to the location information of the second plurality of end points.

10. The method of claim 9, wherein before reporting the second location fingerprint and the first displacement data to the server, the method further comprises receiving, from the server, an instruction instructing to upload a location fingerprint and displacement data to the server.

11. A terminal, comprising:
a memory storing instructions; and
a processor coupled to the memory and configured to execute the instructions, which cause the processor to be configured to:
report a first location fingerprint to a server wherein the first location fingerprint corresponds to a first to-be-determined location;
report a second location fingerprint and first displacement data to the server, wherein the second location fingerprint corresponds to a second to-be-determined location, wherein the first displacement data represents a displacement distance from the first to-be-determined location to the second to-be-determined location; and
receive location information corresponding to the second location fingerprint, wherein a location fingerprint library includes the location fingerprints of the plurality of end points, wherein the location information corresponding to the second location fingerprint is based on a comparison between the first location fingerprint and location fingerprints of a plurality of endpoints that are the displacement distance away from the first to-be-determined location, and wherein to determine the location information corresponding to the second location fingerprint:
a plurality of pieces of to-be-selected location information corresponding to the plurality of reference fingerprints is obtained,
a displacement operation is performed between the plurality of pieces of to-be-selected location information and the first displacement data to obtain the location information of the plurality of end points,
degrees of matching between the second location fingerprint and the location fingerprints of the plurality of end points are determined to obtain a plurality of end point matching degrees,
location information of a second plurality of end points is determined from the location fingerprints of the plurality of end points according to a plurality of start point matching degrees and the plurality of end point matching degrees, wherein the plurality of start point matching degrees are degrees of matching between the first location fingerprint and the plurality of reference fingerprints, and
the location information corresponding to the second location fingerprint is determined according to the location information of the second plurality of end points.

12. The terminal of claim 11, wherein the instructions further cause the processor to be configured to receive an instruction, from the server, instructing to upload a location fingerprint and displacement data to the server.

13. The method of claim 1, further comprising calculating a plurality of weighted sums according to the plurality of start point matching degrees and the plurality of end point matching degrees, wherein an $i^{th}$ weighted sum in the plurality of weighted sums is a sum of a weight of an $i^{th}$ start point matching degree in the plurality of start point matching degrees and a weight of an $i^{th}$ end point matching degree in the plurality of end point matching degrees, wherein the $i^{th}$ start point matching degree is a degree of matching between the first location fingerprint and an $i^{th}$ reference fingerprint in the plurality of reference fingerprints, wherein the $i^{th}$ end point matching degree is a degree of matching between the second location fingerprint and a location fingerprint corresponding to location information of an $i^{th}$ end point in the location information of the plurality of end points, wherein the location information of the $i^{th}$ end point is location information of an end point that is obtained after the displacement operation is performed between the plurality of pieces of to-be-selected location information and the first displacement data, and wherein i is a positive integer less than or equal to M.

14. The method of claim 13, determining a second plurality of largest weighted sums from the plurality of weighted sums.

15. The method according to claim 13, using the location fingerprints of the plurality of end points to obtain the plurality of weighted sums.

16. The server of claim 5, wherein the instructions further cause the processor to be configured to calculate a plurality of weighted sums according to the plurality of start point matching degrees and the plurality of end point matching degrees, wherein an $i^{th}$ weighted sum in the plurality of weighted sums is a sum of a weight of an $i^{th}$ start point matching degree in the plurality of start point matching degrees and a weight of an $i^{th}$ end point matching degree in the plurality of end point matching degrees, wherein the $i^{th}$ start point matching degree is a degree of matching between the first location fingerprint and an $i^{th}$ reference fingerprint in the plurality of reference fingerprints, wherein the $i^{th}$ end point matching degree is a degree of matching between the second location fingerprint and a location fingerprint corresponding to location information of an $i^{th}$ end point in the location information of the plurality of end points, wherein the location information of the $i^{th}$ end point is location information of an end point that is obtained after the displacement operation is performed between the plurality of pieces of to-be-selected location information and the first displacement data, and wherein i is a positive integer less than or equal to M.

17. The server of claim 5, wherein the instructions further cause the processor to be configured to determine plurality of largest weighted sums from the plurality of weighted sums.

18. The server of claim 5, wherein the instructions further cause the processor to be configured to use the location fingerprints of the plurality of end points to obtain the plurality of weighted sums.

19. The method of claim 1, storing, in a memory, the location fingerprint library.

20. The server of claim 5, wherein the memory is further configured to store the location fingerprint library.

* * * * *